United States Patent [19]

Schedler

[11] E Re. 30,174

[45] Reissued Dec. 18, 1979

[54] SOUND SIMULATOR FOR MODEL STEAM ENGINE

[76] Inventor: Walter J. Schedler, 1576 Chickasaw Rd., Arnold, Md. 21012

[21] Appl. No.: 841,970

[22] Filed: Oct. 13, 1977

Related U.S. Patent Documents

Reissue of:

[64] Patent No.: 3,913,097
Issued: Oct. 14, 1975
Appl. No.: 502,423
Filed: Sep. 3, 1974

[51] Int. Cl.[2] ..... G08B 3/00

[52] U.S. Cl. ..... 340/384 E; 340/384 R

[58] Field of Search ..... 340/384 E

[56] References Cited

U.S. PATENT DOCUMENTS

| | | | |
|---|---|---|---|
| 3,438,028 | 4/1969 | Stewart | 340/384 E |
| 3,483,634 | 12/1969 | Staples | 340/384 E |
| 3,676,802 | 7/1972 | Murphree | 340/384 E X |
| 3,718,987 | 3/1973 | Carver | 340/384 E |
| 3,795,873 | 3/1974 | Fein | 340/384 E |

*Primary Examiner*—Harold I. Pitts
*Attorney, Agent, or Firm*—Brady, O'Boyle & Gates

[57] ABSTRACT

A simulator for mounting in a model steam train engine and adapted to emit sounds representative of a regular steam-driven train engine.

23 Claims, 20 Drawing Figures

PUMP VOLTAGE SIGNAL

PUMP EXHAUST SOUND

TRAIN ENGINE STEAM SOUND

SINGLE STROKE AIRPUMP SOUND GENERATOR

SOUND SIMULATOR FOR MODEL STEAM ENGINE

Matter enclosed in heavy brackets [ ] appears in the original patent but forms no part of this reissue specification; matter printed in italics indicates the additions made by reissue.

BACKGROUND OF THE INVENTION

In the field of model trains, much has been done to make exact replicas of the larger full-sized counterparts which they represent. In that regard while some progress has been made to generate systems which attempt to make the model engine sound like the full-sized counterpart, such systems have usually required major modifications of the model and the power controller itself to accommodate the simulator. For instance the power controllers in some instances have had to be replaced or modified and also past simulators frequently have been too large to be totally incorporated in the model itself. In the latter case, some of the sound generating equipment has been positioned with the stationary controller and only the receiver equipment and speaker mounted on the train itself.

It is the purpose of this invention to provide a sound simulator for representing the actual sounds of a steam engine which simulator can be totally incorporated in the small model engine and tender without major modification of that replica, or changes to the power controller.

DESCRIPTION OF THE DRAWINGS

FIGS. 5A-M are waveforms taken from the sound and steam sound simulator of FIG. 4.

DESCRIPTION OF THE INVENTION

Figure 1:
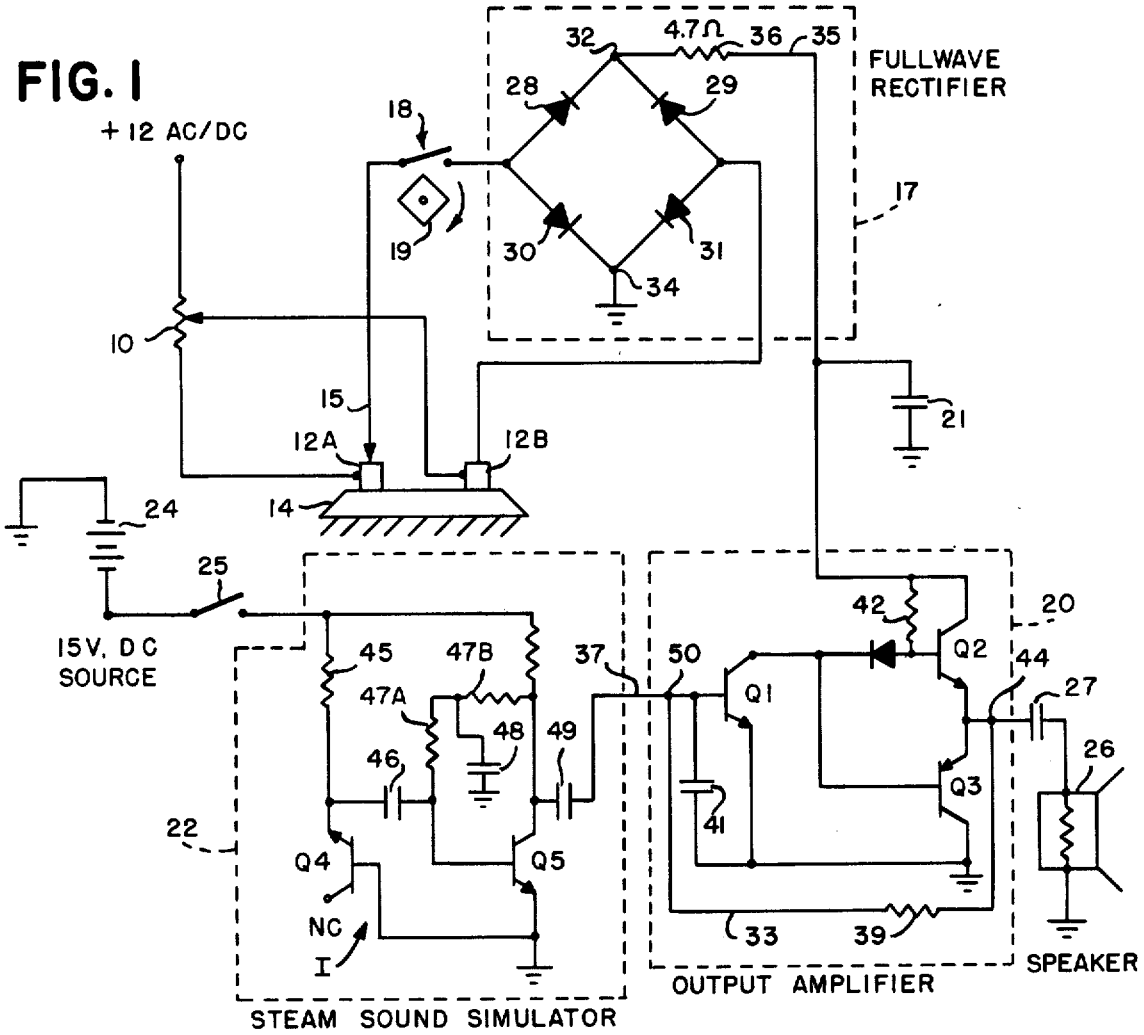
FIG. 1 is a schematic drawing of a first embodiment of the present invention for simulating the sound of a steam engine.

In FIG. 1 is shown a first embodiment of the invention for simulating the basic sound of a steam engine. This circuit will generate synchronized steam exhaust sounds which are associated with the operation of a steam engine. The major components of this embodiment comprise a controller 10 connected with a track 11 represented in cross-section by a pair of rails 12A and 12B mounted on a railroad tie 14. The conductors 15 and 16 connecting with the track are shown as slide connections representing the wheels mounted on the rails. These conductors lead to the input terminals of a full-wave rectifier 17. Included in the conductor 15 is a switch 18 actuated by a rotating cam or commutating disc and wiper switch 19 preferably mounted for turning with one of the driving wheels of the model engine, to provide proper synchronization of 4 exhausts per wheel revolution.

The output from the rectifier 17 is fed to an output amplifier 20 across the terminals of which is connected a large capacitor 21 for filtering out the spikes or other momentary interruptions in the power circuit due primarily to breaks in the connections between the track and the wheels of the model engine. For generating the steam sound source, there is supplied the steam sound simulator 22 having a separate 15 volt DC power source connected at the terminal 24. A switch 25 for disconnecting this power source, which in the preferable form is a battery, serves to limit power drain from the battery when the model engine is not being operated.

Thus in a manner to be explained hereafter, this circuit functions by providing a synchronized and an intermittent steam exhaust sound such as is generated by a normal steam engine, which sound is generated first in the simulator 22 and fed to the output amplifier 20. Power to the amplifier is supplied from the full wave rectifier 17 which power is only periodically applied because of the opening and closing of the synchronizing cam switch 18 which turns with the wheels of the model engine. Because of the intermittent application of power to the amplifier 20 the steam sound signal fed to the speaker 26 appears as a series of short pulses having a repetition rate directly dependent upon the speed of operation of the model engine. Further the loudness of the sound is dependent upon the amount of power supplied to the track which controls the pulling power of the engine, thus the amount of power supplied to the rectifier 17 is directly dependent upon the setting of the controller 10 which determines the speed and pulling power of the engine. A capacitor 27 in series with the speaker 26 filters out any DC signal passing through the circuit.

The rectifier 17 comprises a plurality of diodes 28, 29, 30 and 31 connected in a standard manner to supply a direct current output between the terminals 32 and 34. Terminal 34 is shown connected to ground as is the other input terminal of the amplifier 20. Connected with the terminal 32 is the conductor 35 including a resistor 36 which limits the charge rate into the capacitor 21 to protect the capacitor from failing.

Figure 2A:
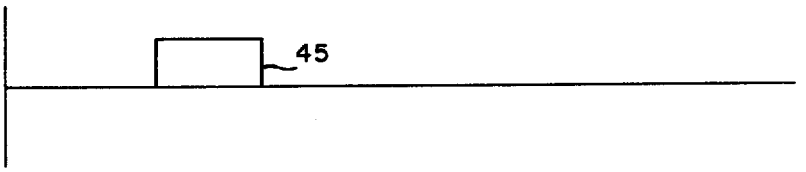
FIGS. 2A-D show selected waveforms of the circuit of FIG. 1.
Figure 2B:
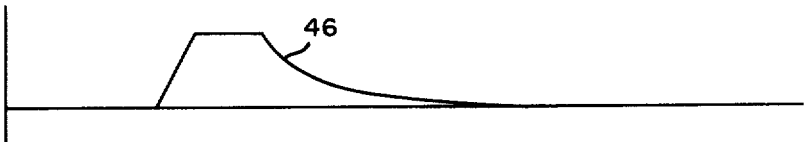

The amplifier 22 comprises the transistors Q1, Q2 and Q3. Thus the sound signal is fed to the base of the transistor Q1 by means of the conductor 37 and after amplification is fed to the transistors Q2 and Q3 connected as a push-pull output stage. The conductor 38 with resistor 39 serves as a feedback path for the signal. Thus the presence of a power signal in the conductor 35 determines whether an output signal is supplied at the output terminal of the amplifier. As shown in FIG. 2A, the closing of the switch 18 results in a momentary power pulse 45 being fed through the rectifier 17 to the amplifier. The amplitude of this pulse will depend upon the setting of the controller 10. Because the capacitor 21 is connected across the power input terminals to the amplifier 20, the voltage buildup is slowed to permit the charging of that capacitor. Thus as indicated in FIG. 2B, the response of the 4.7 ohms resistor 36 and the capacitor 21 is represented by the curve 46.

The steam sound simulator comprises a pair of transistors Q4 and Q5 with the transistor Q4 having no electrical connection to the collector. With the closing of the switch 25 current can flow from the 15 volt source 24. Thus a current 1 passes through the current limiting resistor 45 to the emitter of the transistor Q4. There is a breakdown from emitter to base of the transistor Q4 resulting in the current flow to ground. It is well-known that such an occurrence will cause a white noise signal to be generated which signal is transmitted through the capacitor 46 and amplified by the transistor circuit Q5 including the feedback resistor 47A, 47B and the capacitor 48. In this manner there is supplied through the DC isolation capacitor 49 a white noise signal conducted through the conductor 37 to the signal input terminal 50 of the output amplifier.

Figure 2C:
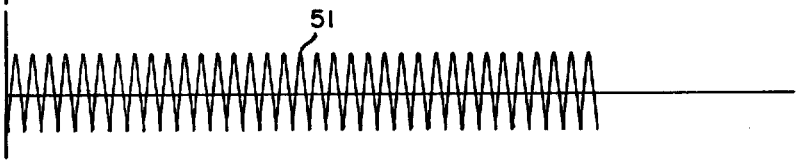
Figure 2D:
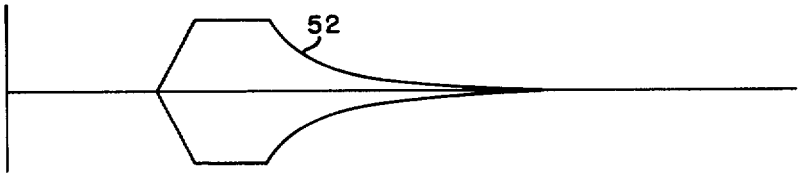

This white noise signal is represented by the waveform 51 in FIG. 2C and this waveform is supplied to the amplifier continuously. With the closing of the cam switch 18 there is supplied at the output terminal 44 of the amplifier signal 52 indicated in FIG. 2D. This signal trails off because of the discharge of the capacitor 21 following the opening of the switch 18 which ceases delivery of power to the amplifier. This capacitor 21 also serves to filter the power signal supplied by the rectifier which normally has 60 Hertz ripple present from the power controller or is momentarily interrupted because of an interruption in the connections between the model engine wheels and the track. This sound duplicates very closely the sound of escaping steam through the smoke stack as the steam pistons of a steam engine are operated through power and exhaust cycles.

Figure 3:
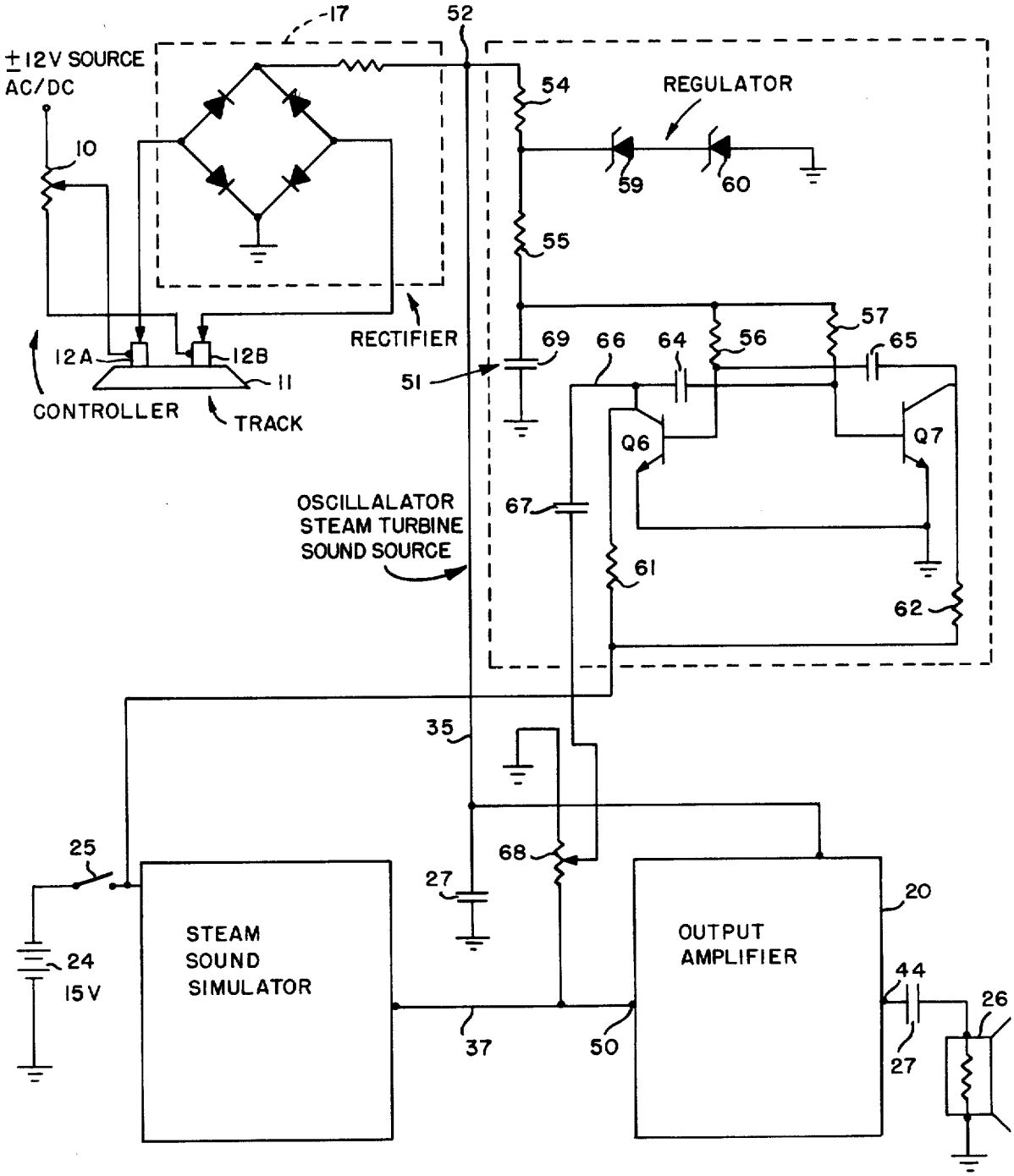
FIG. 3 is a second embodiment of the invention used for simulating the sound of a steam turbine engine.

In FIG. 3 is shown a second embodiment of the invention used for the purpose of simulating a steam turbine train engine sound. Thus there is added to this embodiment the steam turbine sound source.

As shown in the drawing the controller 10, track 11, rectifier 17, steam sound simulator 22 and output amplifier 20 are provided and function in the same manner as in the previous embodiment. The controller provides power to the tracks 12A and 12B which power is fed through the full wave rectifier 17 which in turn supplies power to the output amplifier through the conductor 35. The capacitor 21 is supplied to smooth out any power interruptions. A power source 24 connected through an on-off switch 25 supplies power to the steam sound simulator 22 which in turn supplies the white noise signal through the conductor 37. However, in this embodiment the steam sound simulator source provides the usual continuous white noise signal but the output amplifier is on continuously because of the elimination of any cam switch operated with the turning wheels of the model steam engine. This switch is eliminated because the turbine sound does not include the synchronized steam sound as does a standard steam-driven engine.

There is also added the oscillator 51 for simulating the sound of the steam turbine itself which sound is a signal having a frequency dependent upon the speed of rotation of the steam turbine driving the engine. As illustrated, the oscillator 51 receives the rectified power signal from the rectifier 17 at the terminal 52. This signal is passed through the resistor 54 and resistor 55 to the resistors 56 and 57 connected directly to the bases of the transistors Q6 and Q7. The regulator 58 comprises the zener diodes 59 and 60 which clamp the maximum voltage which can be impressed across these transistors. The collector voltages for the transistors are supplied by the 15 volt source 24 (when the switch 25 is closed) through the resistors 61 and 62 to the collectors of the transistors Q6 and Q7 respectively. The emitters are connected to ground and between the base of each transistor to the emitter of the other transistor is a capacitive coupling including the capacitors 64 and 65 respectively. The output of the oscillator is supplied through the conductor 66 including the capacitor 67 connected with the potentiometer 68, which adjusts the loudness of the high pitch turbine whine.

Thus the transistors Q6 and Q7 conduct alternately. They operate in a standard manner such that as each transistor turns on it in turn drops the base voltage of the other transistor sufficiently to turn it off. The frequency of oscillation depends upon the voltage supplied to the input terminal 52. However, a peak voltage as determined by the regulator 58 sets the maximum frequency at which the oscillator functions. Thus it can be seen that the oscillator 51 supplies an output signal directly proportional to the input voltage received from the rectifier which in turn is set by regulation of the controller 10. Generally this output signal is in the range of 800 to 2,000 cycles per second to approximate the sound of the turbine spinning which is much the same sound as a commercial jet plane taxiing.

By utilization of the capacitor 69, the rise and fall of the oscillator frequency is delayed somewhat due to the charging and discharging of that capacitor depending upon whether the control voltage is being raised or lowered. Thus the sound of a steam turbine is approximated because it normally exhibits a slow windup and a great inertia against slowing down. By delaying the frequency signal with respect to shifting of the control power to the engine, this sound is more closely approximated.

Thus it can be seen that there is provided an onboard sound simulator for mounting in a model steam turbine train engine which approximates the sound of both the turbine operation and the exhaust sound after passage through the turbine. Of course this exhaust sound is constant and is provided by the steam sound simulator 22.

Figure 4:
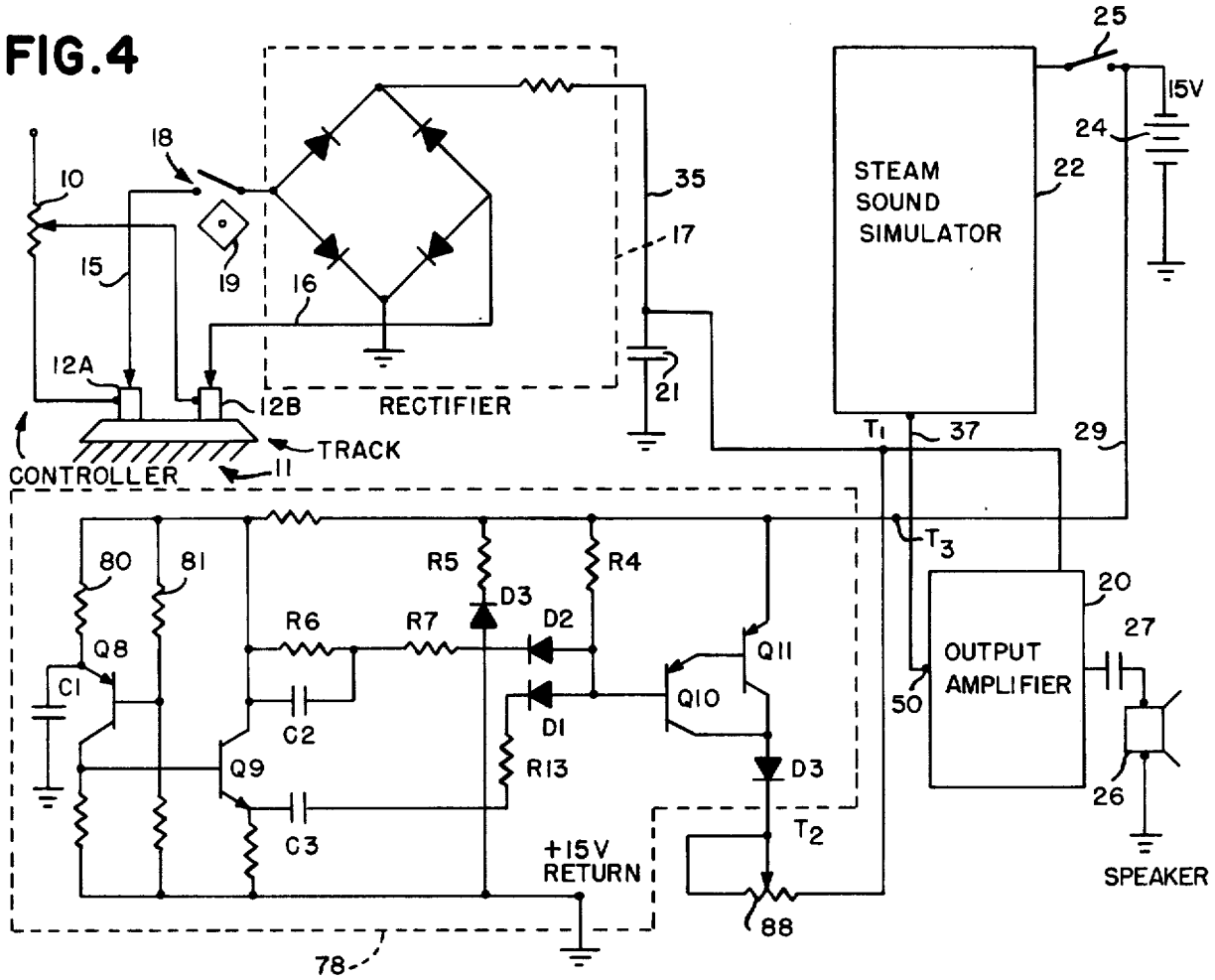
FIG. 4 is a third embodiment of the invention for simulating the sound of a steam engine and a dual stroke air pump.

In FIG. 4 is shown still another embodiment of the invention for the simulation of the sound of a standard steam engine. Such an engine sound has been found to comprise the combination of escaping steam resulting from the reciprocating steam drive plus the air pump exhaust. The reciprocating steam drive generally cycles four times for every revolution of the wheel while the air pump will cycle a plurality of times for every single cycling of the reciprocating drive, or when the engine is completely stopped. The sound generally results from the exhaust of steam as that particular component completes a power cycle. It is this sound simulation that the present embodiment of the invention duplicates.

Figure 5A:
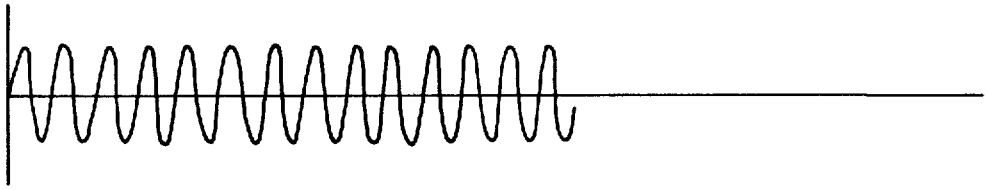
Figure 5C:
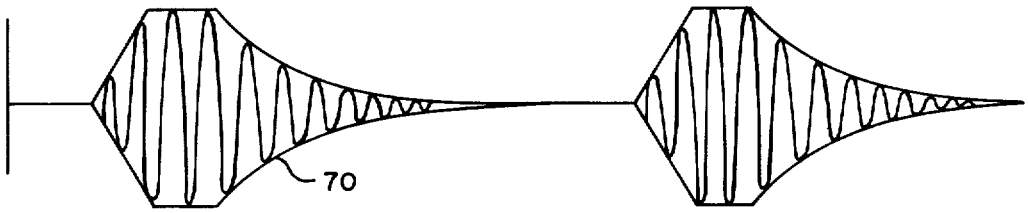
Figure 5B:
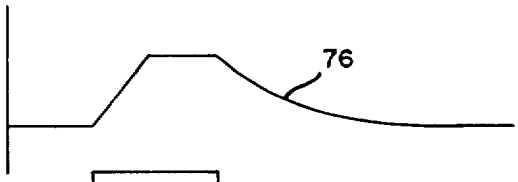
Figure 5D:
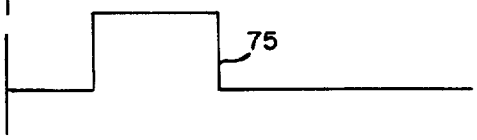
Figure 5E:
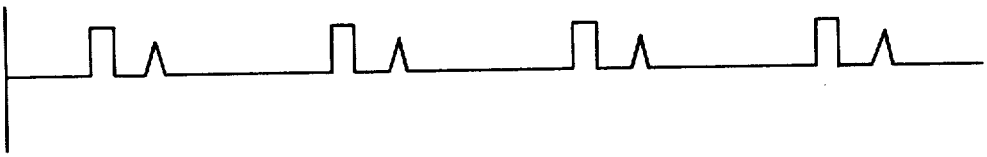
Figure 5F:
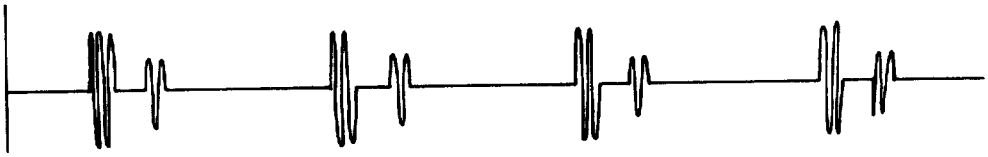
Figure 5G:
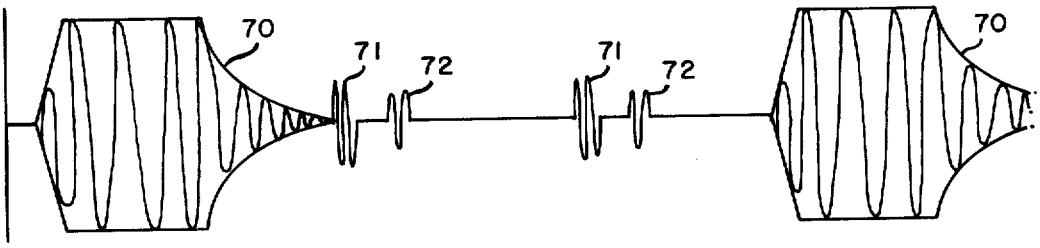

Turning to FIG. 5G one can see a waveform representing the sound of a steam engine. This sound includes intermittently a sound indicated by the waveform 70 which represents the synchronized exhaust from the reciprocating steam engine. This sound is usually louder than the air pump exhaust. Interspersed between and within the waveform 70 is the dual stroke air pump sound indicated by the two waveforms 71 and 72. It is to the simulation of these sounds of a steam engine that the present embodiment is directed. Accordingly and as shown in FIG. 4, the standard controller 10 is provided for supplying power to the rails 12A and 12B of the track 11 mounted on the cross-tie 14. The slide contacts of the wheels are indicated by the conductors 15 and 16 for transmitting power to the rectifier 17. A cam switch 18 normally having a four position cam 19 (other cams or commutators can be used to simulate 3 cylinder or one cylinder steam engines) which opens the switch 4 times each time a wheel turns, serves to interrupt the power flow to the rectifier. From the rectifier by means of the conductor 35 power is supplied through the terminal $T_1$ to the output amplifier 20. Serving to generate a white noise signal, as previously described, is a steam sound simulator 22 connected by the output conductor 37 to the signal input terminal 50 of this amplifier. Thus when switch 25 is closed there is supplied a white noise sound indicated by the waveform 74 in FIG. 5A to the input of the amplifier 20. Each time this amplifier 20 conducts, this signal is conducted through the capacitor 27 to the speaker 26 for broadcasting from the model steam engine.

Thus as described relative to the embodiment of FIG. 1, each time the cam switch 18 closes as indicated by the waveform 75 of FIG. 5D, the amplifier output signal appears as waveform 76 of FIG. 5B. Since there appears normally at the signal input terminal of the amplifier the white noise signal 74, the amplifier output waveform appears as waveform 70 in FIG. 5C. This sound is a simulation of steam exhausting from the reciprocating drive engine as a power cycle is completed.

Figure 5H:
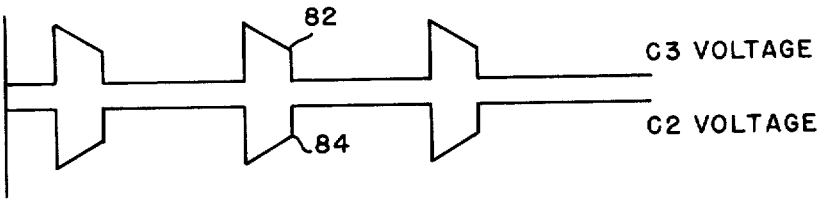
Figure 5J:
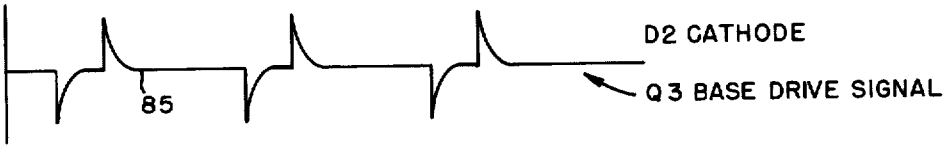
Figure 5K:
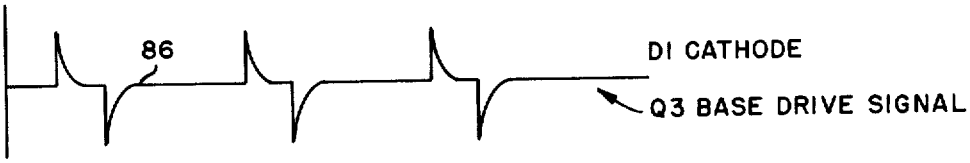
Figure 5L:
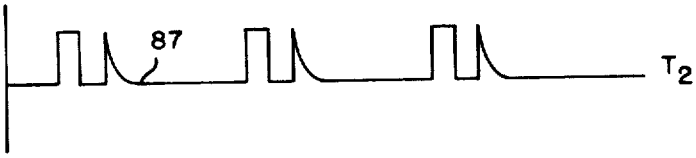

There remains the need to duplicate the dual stroke air pump sound indicated by the waveforms 71 and 72 (FIG. 5G). For this purpose the pump sound simulator 78 is provided which also feeds into the terminal $T_1$ a dual pulse switching signal at a repetition rate of approximately one dual pulse every 3 to 6 seconds. For this purpose the air pump sound simulator 78 receives power from the battery source 24 through the conductor 79 and the terminal $T_3$, which power after passage through the resistor 80 serves to charge the capacitor C1 at a predetermined time rate. After charging, this capacitor permits the emitter voltage of the transistor Q8 to increase sufficiently to overcome that voltage supplied at the base through the resistor 81 to render the transistor conductive. Conduction occurs momentarily so as to raise the base voltage of the transistor Q9 and also cause it to conduct momentarily. As a result a charging current indicated in FIG. 5H by the waveform 82 appears on the capacitor C3 and indicated by the waveform 84 appears at the capacitor C2. Accordingly, the voltage spikes indicated in FIG. 5J by the waveform 85 appear on the cathode of the diode D2 while the waveform FIG. 5K indicates the diode D1 cathode voltage. As a result the transistor Q10 cascaded with the transistor Q11 are caused to conduct the signals indicated in FIG. 5L as the waveform 87. This waveform is fed through the diode D3 and the terminal $T_3$ to the potentiometer 88 which serves to supply a power signal through the terminal T1 to the output amplifier. This power signal has the form as indicated in the waveform 87 with the amplitude not being dependent upon the setting of the controller 10.

Therefore in reality a pair of switches, namely, the cam switch 18 and the dual pump sound simulator 78 are provided to supply an energizing signal through the terminal T1 to the output amplifier. During the time these signals are present, the steam sound waveform generated by the steam sound simulator 22 is conducted through the output amplifier which waveform is represented by the waveform of FIG. 5G.

Figure 6:
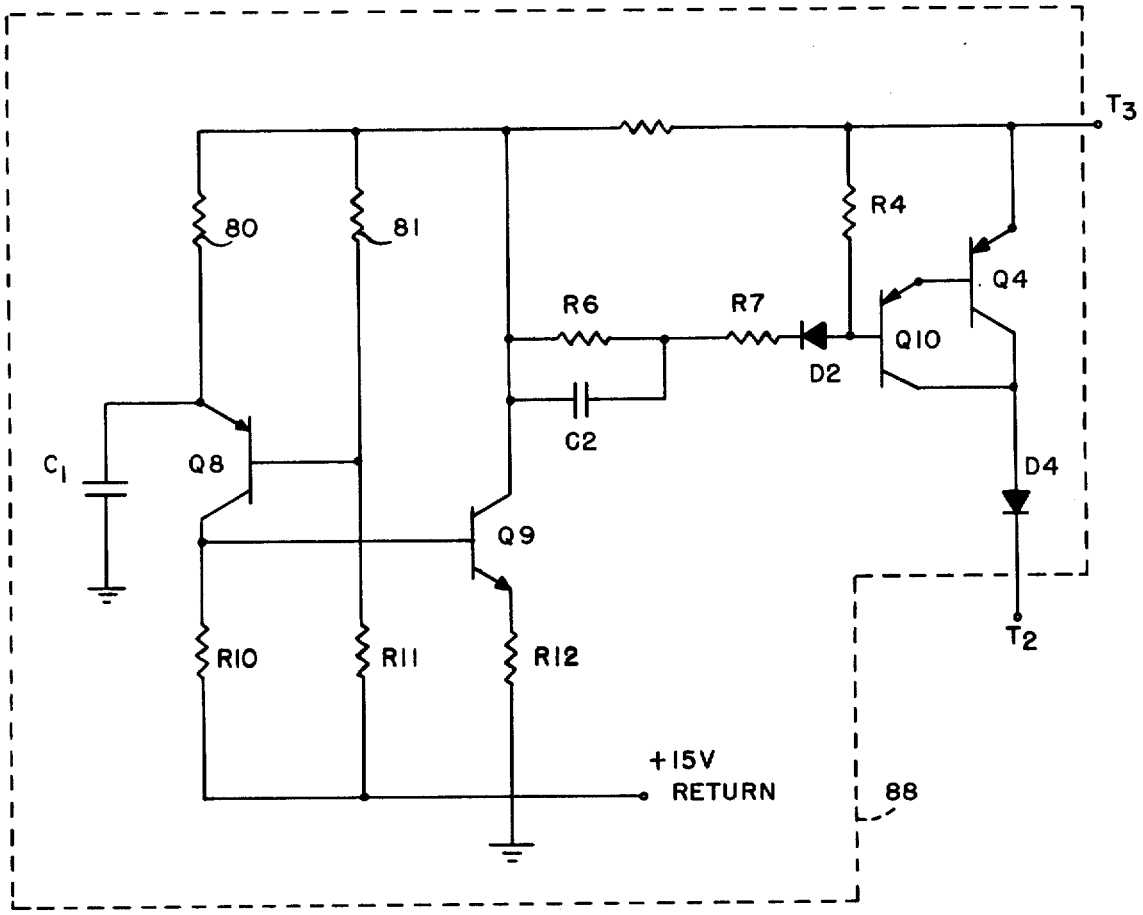
FIG. 6 is a circuit diagram of a single stroke air pump sound simulator.

A further embodiment of the invention is indicated in FIG. 6 wherein a single stroke air pump sound generator 88 is illustrated. This sound generator can be substituted for the sound generator 78 of FIG. 4 by disconnecting the simulator 78 at the terminals T3 and T2 and connecting this generator. In this embodiment there is need only to duplicate a single stroke pump, therefore only the waveform 71 of FIG. 5G is necessary. By the elimination of the capacitor C3 and associated resistor and diode there is provided only the single pulse causing conduction of the transistors Q10 and Q11.

Figure 5M:
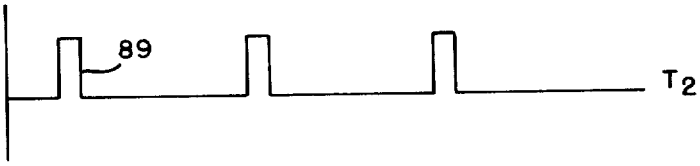

As previously described, the transistor Q8 conducts when the capacitor C1 is sufficiently charged to cause an instantaneous discharge of the capacitor C2. As a result the base of the transistor Q10 is lowered and the cascaded transistors Q10 and Q11 conduct a square wave pulse as indicated by the waveform 89 of FIG. 5M. This waveform when interspersed with the waveform 70 of FIG. 5C represents a steam exhaust of a model steam engine utilizing a single stroke air pump.

The invention claims:

1. A sound generation system for a multi-wheeled model steam engine operating at a speed determined by the magnitude of electric power received from a controller, said system comprising:

an electronic circuit for generating a [constant] white noise signal representing a steam sound;

a switch electrically connected to receive electric power from the engine and including an actuator for turning the switch on momentarily at a rate responsive to the operating speed of the engine;

a full wave rectifier connected to receive electric current from the switch;

an amplifier having power terminals connected to receive electric power from the rectifier for providing an output signal responsive to the magnitude of the power received and synchronously with the closing of the switch, said amplifier also having signal input terminals connected to receive said white noise signal;

a capacitor connected across the power input terminals of the amplifier to filter and smooth out the power signal when any brief interruptions occur due primarily to the controller regulation and electrical connections between the engine and power source being momentarily broken;

a sound speaker connected to receive the amplifier output signal with such signal being the amplified white noise signal representing escaping steam occurring synchronously with the operating speed of the engine to simulate the actual sound of a steam engine.

2. A sound generation system for a model steam engine as defined in claim 1, wherein said switch actuator turns the switch on momentarily a multiplicity of times for each engine wheel revolution.

3. A sound generation system for a model steam engine as defined in claim 1, wherein the magnitude of the electric power received from the engine is directly proportioned to the power supplied to the engine by the controller thereby regulating the magnitude of the amplifier output signal proportional to the operating speed of the engine.

4. A sound generation system for a model steam turbine engine operating at a speed determined by the magnitude of the electric power received from a controller, said system comprising:

a first electronic circuit having signal output terminals for supplying a [constant] white noise signal representing a steam sound, a second electronic circuit for generating a turbine sound signal at the output terminals having a frequency dependent upon the power supplied to the power terminals thereof;

a full wave rectifier electrically connected to receive electrical power from the engine;

an amplifier having power input terminals, and adapted to amplify and supply at output terminals a signal received at signal input terminals having a loudness responsive to power received at the power terminals;

first circuit means connecting the rectifier with the second electronic circuit power terminals and the amplifier power terminals;

second circuit means connecting the first circuit output terminals, the second circuit output terminals and the amplifier signal input terminals to supply the white noise and turbine sound signals to the amplifier; and a sound speaker connected to receive and broadcast the amplifier output terminal signal whereby the turbine sound will be simulated by the second electronic circuit signal and the steam exhaust signal will be simulated by the first electronic circuit signal.

5. A sound generation system as defined in claim 4, including means to adjust the relative amplitudes of the white noise and turbine sound signals.

6. A sound generation system as defined in claim 5, including a capacitor connected across the power input terminal of the amplifier to filter and smooth out the power signal.

7. A sound generation system as defined in claim 6, including a capacitor connected across the power input terminals of the second electronic circuit to filter the power signal supplied thereto and stabilize the frequency of the turbine sound signal supplied thereby.

*8. A sound generation system for a model train including an engine operating at a speed determined by the magnitude of electric power received from a controller, said system comprising;*

*an electronic steam sound simulating circuit;*

*means including a rectifier circuit electrically connected to said controller and being responsive to said magnitude of electric power and operable to generate an intermittent supply potential having a frequency corresponding to the operating speed of the engine;*

*an amplifier circuit coupled to said steam sound simulating circuit, said intermittent supply potential connected to one circuit of said amplifier and steam sound simulating circuits to provide an output signal responsive to the frequency of said intermittent supply potential and in synchronism with the operation of said engine; and*

*a sound transducer connected to said amplifier circuit to receive said output signal with such output signal being a simulated steam sound signal representing escaping steam ocurring synchronously with the operating speed of the engine.*

*9. A sound generation system as defined by claim 8 wherein said rectifier circuit comprises a full wave rectifier.*

*10. A sound generation system as defined by claim 8 wherein said means additionally includes switch means coupled between said controller and said rectifier circuit, and operating at a rate corresponding to the operating speed of the engine.*

*11. A sound generation system for a model train including an engine operating at a speed determined by the magnitude of electric power received from a controller, said system comprising:*

*an electronic steam sound simulating circuit;*

*switch means electrically coupled to said controller by receiving electric power from the engine and including means for being operated at a rate corresponding to the operating speed of the engine;*

*an electrical rectifier circuit connected to said switch means for providing an intermittent supply potential;*

*an amplifier circuit coupled to said circuit simulating a steam sound, said intermittent supply potential from said rectifier circuit being connected to one circuit of said amplifier and steam sound simulating circuits to provide an output signal responsive to the magnitude of said supply potential and in synchronism with the operation of said switch; and*

*a sound speaker connected to receive said output signal with such output signal being a simulated steam sound signal representing escaping steam occurring synchronously with the operating speed of the engine.*

*12. A sound generation system as defined by claim 11 wherein said electronic steam sound simulating circuit comprises a white noise source.*

*13. A sound generation system as defined by claim 12 wherein said white noise source comprises a constant white noise source.*

*14. The sound generation system as defined by claim 11 wherein said rectifier circuit comprises a full wave rectifier circuit.*

*15. A sound generation system as defined by claim 11 and additionally including circuit means coupled between said electrical rectifier circuit and said one circuit for filtering and smoothing out said intermittent supply potential when any brief interruptions occur due primarily to controller reguation and electrical connections between the engine and power source being momentarily broken.*

*16. A sound generation system as defined by claim 11 and additionally including electrical filter means coupled between said rectifier circuit and said one circuit.*

*17. A sound generation system as defined by claim 16 wherein said electrical filter means comprises a capacitor connected across the output of said rectifier circuit.*

*18. A sound generation system for a model train including a turbine engine operating at a speed determined by the magnitude of the electric power received from a controller, said system comprising:*

*a first electronic circuit being operable to generate a signal simulating a steam sound;*

*a second electronic circuit being operable to generate a signal simulating a turbine sound, said turbine sound signal having a frequency dependent upon the magnitude of the electric power received from the controller;*

*an electrical rectifier circuit electrically connected to receive electrical power of a magnitude determined by said controller and providing an output supply potential the amplitude of which varies accordingly;*

*an amplifier circuit coupled to the output of said first and second electronic circuits and said output supply potential being coupled to at least one of said first and second electronic circuits to provide a composite output signal having a magnitude which varies in accordance with the amplitude of said output supply potential; and*

*a sound speaker connected to receive said composite output signal with such signal being a simulated steam and turbine sound occurring in response to the operating speed of the engine.*

*19. A sound generation system as defined by claim 18 wherein said first electronic circuit comprises a white noise source.*

*20. A sound generation system as defined by claim 19 wherein said white noise source comprises a constant white noise source.*

*21. A sound generation system as defined by claim 18 wherein said second electronic circuit comprises an oscillator circuit coupled to said output supply potential of said rectifier circuit, said oscillator being further operable to have its frequency of operation controlled by the amplitude of said output supply potential.*

*22. A sound generation system as defined by claim 18 and additionally including a filter circuit coupled across the output of said rectifier circuit to filter and smooth out said output supply potential.*

*23. A sound generation system as defined by claim 22 wherein said filter circuit comprises a capacitor coupled across the output of said rectifier circuit.*

* * * * *